US 10,656,083 B2

(12) United States Patent
Plant et al.

(10) Patent No.: US 10,656,083 B2
(45) Date of Patent: May 19, 2020

(54) CHIRPED LASER DISPERSION SPECTROSCOPY SENSITIVITY BOOSTER (71) Applicant: The Trustees of Princeton University, Princeton, NJ (US)

(72) Inventors: Genevieve Plant, Princeton, NJ (US); Yifeng Chen, Princeton, NJ (US); Gerard Wysocki, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/307,253

(22) PCT Filed: Jun. 6, 2017

(86) PCT No.: PCT/US2017/036164
§ 371 (c)(1),
(2) Date: Dec. 5, 2018

(87) PCT Pub. No.: WO2017/214155
PCT Pub. Date: Dec. 14, 2017

(65) Prior Publication Data
US 2019/0257751 A1 Aug. 22, 2019

Related U.S. Application Data (60) Provisional application No. 62/345,953, filed on Jun. 6, 2016.

(51) Int. Cl.
*G01N 21/45* (2006.01)
*G01N 21/59* (2006.01)
(Continued)

(52) U.S. Cl.
CPC .............. *G01N 21/45* (2013.01); *G01B 9/02* (2013.01); *G01J 3/433* (2013.01); *G01N 21/59* (2013.01);
(Continued)

(58) Field of Classification Search
CPC ....... G01B 9/02008; G01B 9/02; G01J 3/433; G01J 3/45; G01J 3/453; G01N 21/39;
(Continued)

(56) References Cited

U.S. PATENT DOCUMENTS 5,357,574 A * 10/1994 Whitecar .................. H03D 1/22
331/20
9,025,163 B2    5/2015 Wysocki et al.
(Continued)

FOREIGN PATENT DOCUMENTS

EP            1166469 B1    8/2005

OTHER PUBLICATIONS

International Search Report for PCT/US2017/036164, dated Aug. 21, 2017.
(Continued)

*Primary Examiner* — Dominic J Bologna
(74) *Attorney, Agent, or Firm* — Meagher Emanuel Laks Goldberg & Liao, LLP (57) ABSTRACT

A sensitivity boosted laser dispersion spectroscopy system for sensing a sample in a sample cell or in an open path crossing the sample. The system includes a local oscillator arm and a sample arm containing the sample cell or the open path crossing the sample. A laser source is configured to generate a first light beam directed along the sample arm and a second light beam, the second light beam being frequency shifted and directed along the local oscillator arm. An intensity modulator/phase modulator/frequency shifter is disposed in the sample arm configured to generate a multi-frequency beam having known frequency spacing which is then passed through the sample cell to generate a sample arm output. A beam combiner is configured to combine the sample arm output and the second light beam from the local oscillator arm and generate a combined beam. A photode-
(Continued)

tector is configured to detect the combined beam for sensing the sample in the sample cell.

34 Claims, 10 Drawing Sheets

(51) Int. Cl.
  *G01J 3/433* (2006.01)
  *G02F 1/35* (2006.01)
  *G01B 9/02* (2006.01)
  *G01J 3/45* (2006.01)
(52) U.S. Cl.
  CPC .......... *G02F 1/35* (2013.01); *G01J 2003/451* (2013.01); *G01N 2021/451* (2013.01)
(58) Field of Classification Search
  CPC .......... G01N 21/255; G01N 2021/399; G01N 2201/06113; G02F 1/01; G02F 1/0121; G02F 1/3532
  See application file for complete search history.

(56) References Cited

U.S. PATENT DOCUMENTS

| | | | |
|---|---|---|---|
| 9,068,940 B2 | 6/2015 | Nikodem et al. | |
| 10,067,055 B1* | 9/2018 | Vakhshoori | G01J 3/4338 |
| 2013/0010302 A1* | 1/2013 | Sharma | A61B 3/102 |
| | | | 356/479 |
| 2015/0159990 A1* | 6/2015 | Plusquellic | G01N 21/255 |
| | | | 356/451 |

OTHER PUBLICATIONS

Written Opinion for PCT/US2017/036164, dated Aug. 21, 2017.
M. Nikodem, G. Plant, Z. Wang, P. Prucnal, and G. Wysocki, "Chirped lasers dispersion spectroscopy implemented with single- and dual-sideband electro-optical modulators," Optics Express 21, 14649-J 4655 (2013).
M. Nikodem, D. Weidmann, and G. Wysocki, "Chirped laser dispersion spectroscopy with harmonic detection of molecular spectra," Applied Physics B 109, 477-483 (2012).
M. Nikodem and G. Wysocki, "Molecular dispersion spectroscopy—new capabilities in laser chemical sensing," Annals ofthe New York Academy of Sciences 1260, 101-111 (2012).
G. Wysocki and D. Weidmann, "Molecular dispersion spectroscopy for chemical sensing using chirped mid-infrared quantum cascade laser," Optics Express 18, 26123-26140 (2010).
G. Plant, A. Hangauer, and G. Wysocki, "Fundamental Limits in Chirped Laser Dispersion Spectroscopy," in CLEO: 2015, OSA Technical Digest (online) (Optical Society of America, 2015), SM1 0 .2.
P. Martin-Mateos and P. Acedo, "Heterodyne phase-sensitive detection for calibration-free molecular dispersion spectroscopy," Optics Express 22, 15143-15153 (2014).
G. B. Rieker, F. R. Giorgetta, W. C. Swann, J. Kofler, A.M. Zolot, L. C. Sinclair, E. Baumann, C. Cromer, G. Petron, C. Sweeney, P. P. Tans, I. Coddington, and N. R. Newbury, "Frequency-comb-based remote sensing of greenhouse gases over kilometer air paths," Optical, 290-298 (2014).
F. R. Giorgetta, G. B. Rieker, E. Baumann, W. C. Swann, L. C. Sinclair, J. Kofler, I. Coddington, and N. R. Newbury, "Broadband Phase Spectroscopy over Turbulent Air Paths," Physical Review Letters 115, 103901 (2015).

* cited by examiner

CHIRPED LASER DISPERSION SPECTROSCOPY SENSITIVITY BOOSTER

CROSS-REFERENCE TO PRIOR FILED APPLICATIONS

This application claims priority to U.S. provisional application 62/345,953 filed Jun. 6, 2016, which is incorporated herein in its entirety.

FIELD OF THE INVENTION

The present disclosure generally relates to the field of laser dispersion spectroscopy systems and in particular sensitivity boosted laser dispersion spectroscopy systems including CLaDS, CM-CLaDS, FM and frequency-comb spectroscopy systems.

BACKGROUND

Chirped Laser Dispersion Spectroscopy (CLaDS) provides a measure of optical dispersion resultant from the interaction of laser light with the molecular transitions of a target species. To probe optical dispersion, a multi-frequency (e.g. two or three color) beam is generated with a well-defined frequency spacing. When the different frequency components interact with the resonant transition, each component experiences a different index of refraction. At the detector, optical heterodyne detection is performed, and the dispersion effects are retrieved through measurements of the instantaneous frequency of the beatnote signal. The sample dispersion spectrum can be used to identify the sample and to determine its concentration. What is needed are systems and methods for direct improvement of SNR of the instrument. This would result in lower chemical detection limits and improved sensitivities of instrumentation for detection of important trace gases in environmental, industrial, and medical applications particularly in systems implemented in free space with long sample arm lengths.

SUMMARY OF THE INVENTION

A sensitivity boosted laser dispersion spectroscopy system for sensing a sample in a sample cell or in an open path crossing the sample is disclosed. The system includes a local oscillator arm and a sample arm containing the sample cell or in an open path crossing the sample. A laser source is configured to generate a first light beam directed along the sample arm and a second light beam, the second light beam being frequency shifted and directed along the local oscillator arm. An intensity modulator/phase modulator/frequency shifter is disposed in the sample arm configured to generate a multi-frequency beam having known frequency spacing which is then passed through the sample cell to generate a sample arm output. A beam combiner is configured to combine the sample arm output and the second light beam from the local oscillator arm and generate a combined beam. A photodetector is configured to detect the combined beam for sensing the sample in the sample cell.

The system may include a ramp function generator coupled to the laser source to generate chirped first and second light beams for chirped laser dispersion spectroscopy (CLaDS). A beam splitter may be configured to generate the first and second light beams from a single laser. A frequency shifter may be disposed in the local oscillator arm configured to generate a frequency shifted light beam from the single laser. The frequency shifted light beam on the local oscillator arm may have an amplitude that is set based on a saturation level of the photo detector. The frequency shifted light beam on the local oscillator arm may have a first amplitude and the sample arm output may have a second amplitude wherein the first amplitude is at least 100× the second amplitude. A second laser may be configured to generate a frequency shifted light beam for the local oscillator arm.

A notch filter may be coupled to the photo detector, the notch filter being configured to generate a filtered output. A frequency multiplier may be coupled to the notch filter, the frequency multiplier being configured to generate a multiplied filtered output. A demodulator may be coupled to the frequency multiplier, the demodulator being configured to generate a demodulated output. An analog to digital (A/D) converter may be coupled to the photodetector, the A/D converted being configured to generate a digital output. A notch filter may be coupled to the digital output, the notch filter being configured to generate a filtered digital output. A frequency multiplier may be coupled to the notch filter, the frequency multiplier being configured to generate a multiplied filtered digital output. A demodulator may be coupled to the frequency multiplier, the demodulator being configured to generate a demodulated digital output.

A second photo detector configured for balanced detection of the combined beam. At least one of the intensity modulator/phase modulator/frequency shifter in the sample arm and frequency shifter in the local oscillator arm are acousto-optic modulators. The intensity modulator/phase modulator/frequency shifter in the sample arm may be an electro-optic modulator and the frequency shifter in the local oscillator arm may be an acousto-optic modulator. AT least one of the intensity modulator/phase modulator/frequency shifter in the sample arm and frequency shifter in the local oscillator arm may be comprised of delay lines.

A sensitivity boosted frequency comb laser dispersion spectroscopy system for sensing a sample in a sample cell is also disclosed. The system includes a local oscillator arm and a sample arm containing the sample cell. Laser sources are configured to generate a first frequency comb light beam having its frequency components separated by the first interval and a second frequency comb light beam having its frequency components separated by the second interval that is different than the first interval. The first and the second frequency comb light beams are co-aligned on a beam combiner and directed along the sample arm to create a sample arm output and a third frequency comb light beam having its frequency components separated by the third interval that is different than the first and the second interval. The third frequency comb light beam is directed along the local oscillator arm. A beam combiner is configured to combine the first and the second frequency comb light beams and generate a combined sample beam. A second beam combiner is configured to combine the sample arm output and the third light beam from the local oscillator arm and generate a combined beam. A photodetector configured to detect the combined beam for sensing the sample in the sample cell.

The second frequency comb light beam on the local oscillator arm may have an amplitude that is set based on a saturation level of the photo detector. The second frequency comb light beam on the local oscillator arm may have a first amplitude and sample arm output may have a second amplitude wherein the first amplitude is at least 100× the second amplitude.

A notch comb filter may be coupled to the photo detector, the notch comb filter being configured to generate a filtered output. A frequency multiplier may be coupled to the notch comb filter, the frequency multiplier being configured to generate a multiplied filtered output. A demodulator may be coupled to the frequency multiplier, the demodulator being configured to generate a demodulated output. An analog to digital (A/D) converter may be coupled to the photodetector, the A/D converted being configured to generate a digital output. A notch comb filter may be coupled to the digital output, the notch comb filter being configured to generate a filtered digital output. A frequency multiplier may be coupled to the notch comb filter, the frequency multiplier being configured to generate a multiplied filtered digital output. A demodulator may be coupled to the frequency multiplier, the demodulator being configured to generate a demodulated digital output. A second photo detector may be configured for balanced detection of the combined beam.

A method for sensing a sample in a sample cell using a sensitivity boosted laser dispersion spectroscopy system is also disclosed. The method includes providing a local oscillator arm and a sample arm containing the sample cell. The method also includes generating a first light beam directed along the sample arm and a second light beam, the second light beam being frequency shifted and directed along the local oscillator arm. The method also includes generating a multi-frequency beam in the sample arm, the multi-frequency beam having known frequency spacing which is then passed through the sample cell to generate a sample arm output. The method includes combining the sample arm output and the second light beam from the local oscillator arm and generate a combined beam. The method also includes detecting the combined beam for sensing the sample in the sample cell.

The method may also include generating chirped first and second light beams for chirped laser dispersion spectroscopy (CLaDS). The first and second light beams may be generated from a single laser. A frequency shifted light beam may be generated from the single laser. The frequency shifted light beam on the local oscillator arm may have an amplitude that is set based on a saturation level of the photo detector. The frequency shifted light beam on the local oscillator arm may have a first amplitude and sample arm output may have a second amplitude wherein the first amplitude is at least 100× the second amplitude.

The method may also include notch filtering the detected combined beam to generate a filtered output, frequency multiplying the filtered output generate a multiplied filtered output and demodulating the multiplied filtered output to generate a demodulated output. The method may also include analog to digital (A/D) converting the detected combined beam to generate a digital output, notch filtering the digital output to generate a filtered digital output, frequency multiplying the filtered digital output to generate a multiplied filtered digital output and demodulating the multiplied filtered digital output to generate a demodulated digital output. Balanced detection may be performed on the combined beam.

A method for sensing a sample in a sample cell using a sensitivity boosted frequency comb laser dispersion spectroscopy system is also disclosed. The method also includes providing a local oscillator arm and a sample arm containing the sample cell. The method also includes generating a first frequency comb light beam directed along the sample arm to create a sample arm output and a second frequency comb light beam, the second frequency comb light beam being frequency shifted and directed along the local oscillator arm. The method also includes combining the sample arm output and the second light beam from the local oscillator arm and generating a combined beam. The method also includes detecting the combined beam for sensing the sample in the sample cell.

The second frequency comb light beam on the local oscillator arm may have an amplitude that is set based on a saturation level of the photo detector. The second frequency comb light beam on the local oscillator arm may have a first amplitude and sample arm output may have a second amplitude wherein the first amplitude is at least 100× the second amplitude.

The method may also include notch comb filtering the detected combined beam to generate a filtered output, frequency multiplying the filtered output generate a multiplied filtered output and demodulating the multiplied filtered output to generate a demodulated output. The method may also include analog to digital (A/D) converting the detected combined beam to generate a digital output, notch comb filtering the digital output to generate a filtered digital output, frequency multiplying the filtered digital output to generate a multiplied filtered digital output and demodulating the multiplied filtered digital output to generate a demodulated digital output. Balanced detection may be performed on the combined beam.

DETAILED DESCRIPTION

This disclosure is primarily directed to chirped laser dispersion spectroscopy (CLaDS) sensitivity booster. The disclosed system and method enables improved performance in an established technology used for laser spectroscopic chemical sensing. It is compatible with all Chirped Laser Dispersion Spectroscopy based techniques (CLaDS, CM-CLaDS etc. patented earlier by Wysocki et al at Princeton, e.g., U.S. Pat. Nos. 9,068,940 and 9,025,163, incorporated herein by reference as if fully disclosed herein). It can also be applied to boost sensitivity of other spectroscopic sensing systems based on FM and frequency-comb spectroscopy.

With the system and methods disclosed herein, the output signal-to-noise ratio (SNR) in the trace-gas sensing technique CLaDS, or chirp-modulated CLaDS (CM-CLaDS) can be significantly improved. In CLaDS systems, the output signal-to-noise is determined by the Carrier-to-Noise Ratio (CNR) of the radio frequency (RF) signal at the input to frequency demodulator. Through the use of the techniques disclosed herein, the CNR of the RF beatnote can be enhanced. This leads to a direct improvement of SNR of the instrument, results in lower chemical detection limits, and improved sensitivities of instrumentation for detection of important trace gases in environmental, industrial, and medical applications. The disclosed techniques are especially suitable for remote sensing application in a hard-target back-scatter configuration, where the return signal is usually very low and the heterodyne-enhancement disclosed here will significantly improve the remote sensing system sensitivity.

CLaDS provides a measure of optical dispersion resultant from the interaction of laser light with the molecular transitions of a target species. To probe optical dispersion, a multi-frequency (e.g. two or three color) beam is generated with a well-defined frequency spacing. When the different frequency components interact with the resonant transition, each component experiences a different index of refraction. At the detector, optical heterodyne detection is performed, and the dispersion effects are retrieved through measurements of the instantaneous frequency of the beatnote signal. The sample dispersion spectrum can be used to identify the sample and to determine its concentration. A chirp of the laser frequency provides significant enhancement of the dispersion signal. By probing the dispersion induced the sample, CLaDS (a phase sensitive technique) offers potential advantages over conventional absorption based techniques, namely the linearly between the dispersion and the sample absorbance and therefore concentration, and the immunity to intensity/amplitude fluctuations. Rejection of induced phase noise is achieved through co-propagation of the multi-frequency beam through the sample. Therefore, the phase noise acquired due to light propagation through the sample medium (e.g. atmospheric turbulence in remote sensing systems) is in common mode amongst the frequency components and is therefore rejected through the differential processing of the received signals.

The output noise in a CLaDS measurement is determined by the noise sources present at the input of the frequency demodulator. With an input noise power spectral density, given by $N_i$ ($A^2$/Hz), the process of frequency demodulation results in an output noise power spectral density given by Eq. (1) for a given carrier amplitude, A.

$$S_o(f) = \frac{N_i}{A^2} f^2, \text{ for } |f| < B \tag{1}$$

The output noise of the demodulator, and therefore the noise in the CLaDS signal, is subsequently calculated by integrating the noise power spectral density over the signal bandwidth B. The result of this is given in Eq. (2).

$$\sigma_{CLaDS} = \sqrt{\frac{2N_i \cdot B^3}{3A^2}} = \sqrt{\frac{B^2}{3 \cdot CNR}} \tag{2}$$

Therefore, for a given carrier-to-noise ratio (CNR=$A^2$/($2N_iB$)) and bandwidth at the input of the detection system, the noise in the CLaDS measurement can be modeled.

Assuming the same detection bandwidth, B (which is determined by the chirp rate and signal strength), Eq. (2) shows that the output noise in the CLaDS signal can be reduced through an increase in the CNR of the received RF beatnote signal. However, in CLaDS, as well as in other dispersion spectroscopy techniques, the phase signal is extracted from co-propagating electromagnetic (EM) waves. External phase noise is common mode and therefore rejected through the differential measurement. As a result of this co-transmission, all the EM wave amplitudes are attenuated, effectively eliminating the heterodyne gain (in terms of amplitude) of the photo-detection process, and resulting in a relatively low CNR at the input to the frequency demodulator.

The heterodyne detection of two EM waves with amplitudes $A_1$, $A_2$, frequencies $\omega_1$, $\omega_2$, and phases $\varphi_1$, $\varphi_2$, produces a beatnote photocurrent that is proportional to:

$$I = A_1^2 + A_1^2 2A_1 A_2 \cos((\omega_1 - \omega_2)t - (\varphi_1 - \varphi_2)) + 2A_1 A_2 \cos((\omega_1 + \omega_2)t - (\varphi_1 + \varphi_2)). \tag{3}$$

In previous CLaDS systems, the carrier amplitude (A in Eq. (2)) was determined by the multiplication of two attenuated amplitudes, yielding a low carrier amplitude, and therefore relatively low CNR.

Figure 1A:
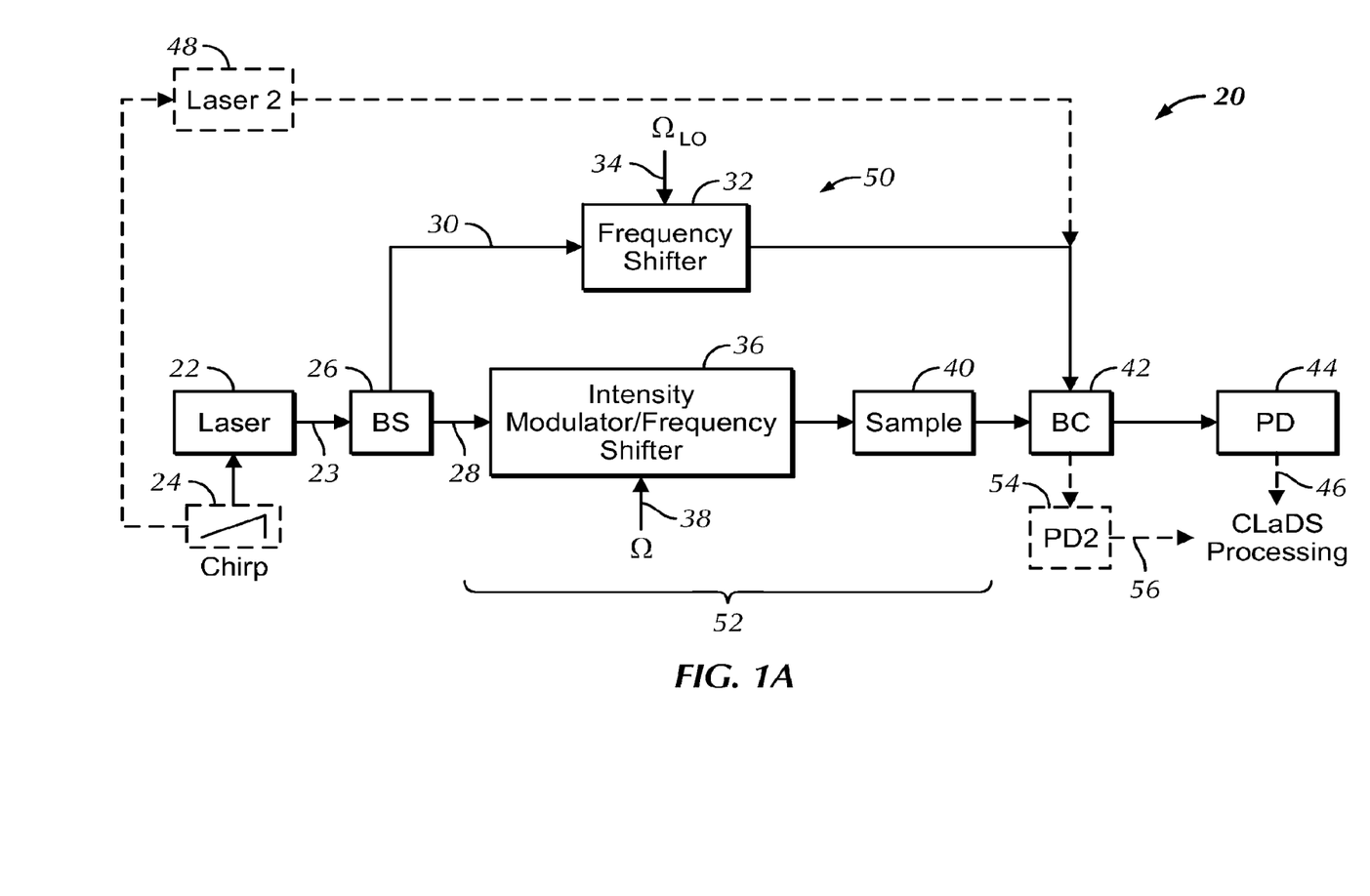
FIG. 1A is a block diagram of a sensitivity boosted laser dispersion spectroscopy system.
Figure 3A:
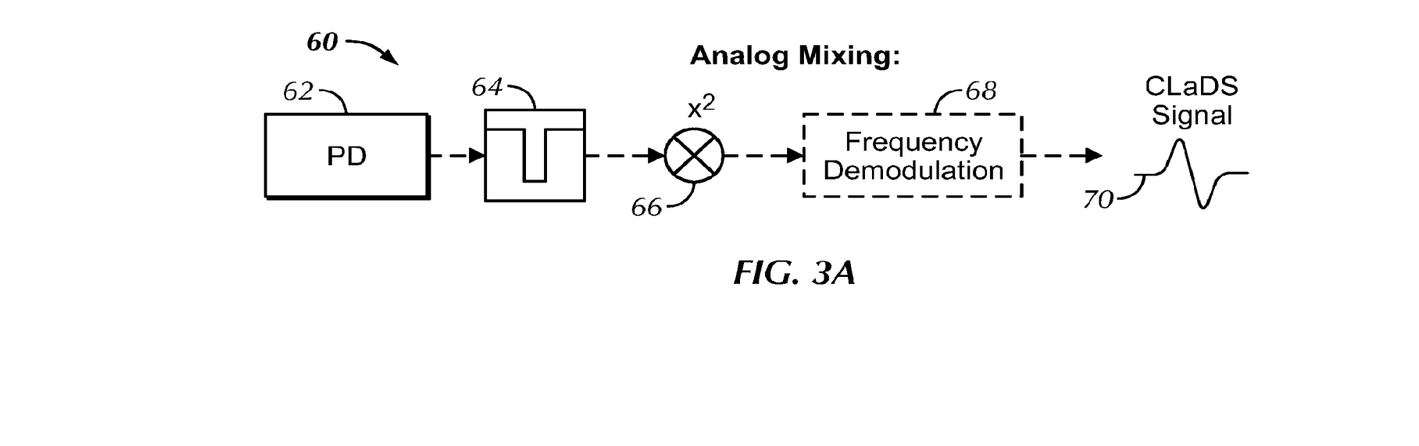
FIG. 3A is a block diagram showing the processing system using an analog approach.
Figure 3B:
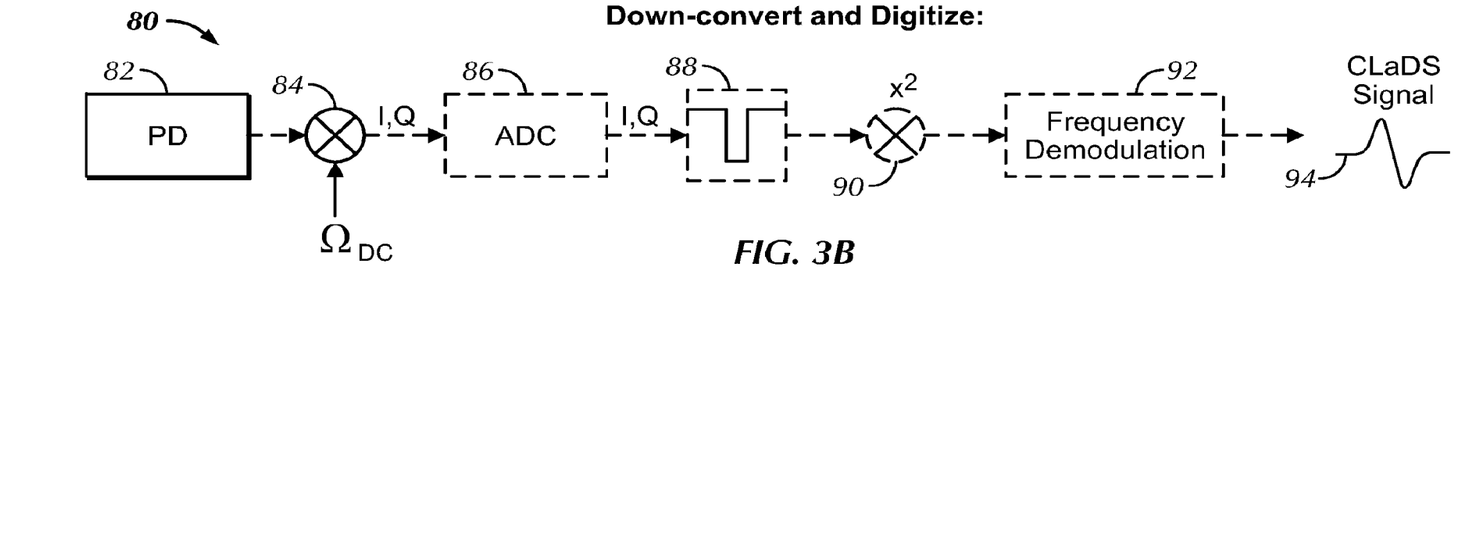
FIG. 3B is a block diagram showing the processing system using a digital approach.

In contrast, the approach disclosed herein provides a method to increase the CNR of the input signal to a CLaDS system through use of a strong local oscillator (LO) optical signal and heterodyne detection. FIG. 1A is a block diagram of a sensitivity boosted CLaDS system 20. To overcome the CNR limitation in previous CLaDS systems, an additional LO channel has been incorporated into the system in conjunction with additional frequency mixing of the received RF beatnote signal to extract the CLaDS spectra (outlined in FIG. 3). In FIG. 1, the optical configuration for the LO-enhanced CLaDS is detailed. The system 20 includes a laser light source as generally shown by laser 22 having a carrier frequency. It should be understood that the disclosed boosted laser dispersion spectroscopy system 20 may be used in connection with CLaDS as well as other spectroscopy techniques such as FM spectroscopy. In this example a ClaDS system is shown so laser light source 22 has an associated ramp function generator 24 configured to scan the laser light source 22 over a range of frequencies. In a FM spectroscopy system block 24 is optional. The output from the chirped laser light source 23 is split using a beam splitter (BS) into two arms, a local oscillator channel shown generally by reference number 50 and a sample channel shown generally by reference number 52. It should be understood that an alternative arrangement may be used in which the beam splitter 26 and the frequency shifter 32 are removed and a second laser source 48 is coupled to the ramp function generator 24 to generate the chirped and frequency shifted laser light source for the local oscillator channel 50. A similar configuration with a second laser source can be used in a FM spectroscopy system in which the frequency chirp and thus block 24 are optional.

The sample channel 52 follows the original CLaDS system configuration where an intensity modulator/phase modulator/frequency shifter 36 is used to generate a multi-frequency beam with known frequency spacing, $\Omega$ (controllable by input 38). Intensity modulator/frequency shifter 36 generates addition sidebands (e.g., one or two) at $\Omega$ around the laser 22 carrier frequency. These co-propagating frequencies interact with the sample under test in the sample cell 40 where the sample's dispersion profile is encoded into the time-varying frequency spacing of the multi-frequency signal. In the LO channel 50, the original laser frequency is shifted via frequency shifter 32 by a known amount, $\Omega_{LO}$ (controllable by input 34). The LO channel 50 and the sample channel 52 are then recombined using a beam combiner (BC) 42 and heterodyne mixed on the photodetector (PD) 44. The output 46 of the PD 44 is then processed as discussed in more detail below. It should be understood that a balanced detection configuration may also be used. In this case a second photo detector 54 is position orthogonal to PD 44 and generates a second output 56. The first and second PD outputs 46 and 56 are then processed using conventional methods to provide improved noise cancellation.

The photocurrent produced in the square low photodetector contains the beatnote(s) between the multiple waves in the sample channel as well as the beatnote between each of those waves transmitted through the sample and the LO. Due to the limited bandwidth of the photodetector, only the difference frequency component in Eq. 3 will be present in the photocurrent signal. To demonstrate an example, consider CLaDS with single-sideband modulation (only two wave components in the sample channel). The LO frequency can be chosen freely, but if the LO is derived from the same laser source the frequency shift must be within the constraints of the technology used. Two distinct examples will be considered: 1) with the optical frequency of the LO being smaller/larger than the frequencies of the two wave components or 2) LO optical frequency falling between the frequencies of the two wave components in the sample channel. The frequency difference between the LO and the closest frequency component in the signal channel is marked as $\Omega_{LO}$. In the first case the common-mode phase noise (e.g. due to turbulence) observed for all optical waves in the sample channel is correlated with respect to the LO frequency. In contrast, in the second case the common-mode phase noise observed for all optical waves in the sample channel is anti-correlated with respect to the LO frequency. FIGS. 2A-2D pictorially explains this process.

Figures 2A, 2C:
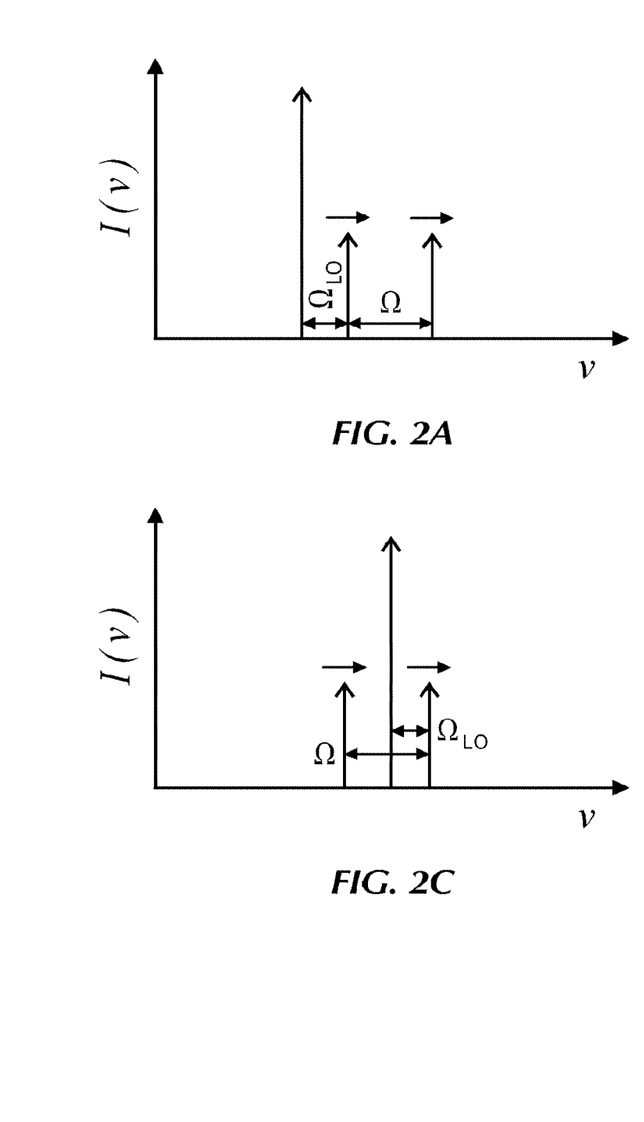
FIG. 2A shows a single-sideband CLaDS optical spectrum with an LO frequency lower than the two wave components in the sample channel.
FIG. 2C shows a single-sideband CLaDS optical spectrum with an LO frequency between the two wave components.
Figure 2B:
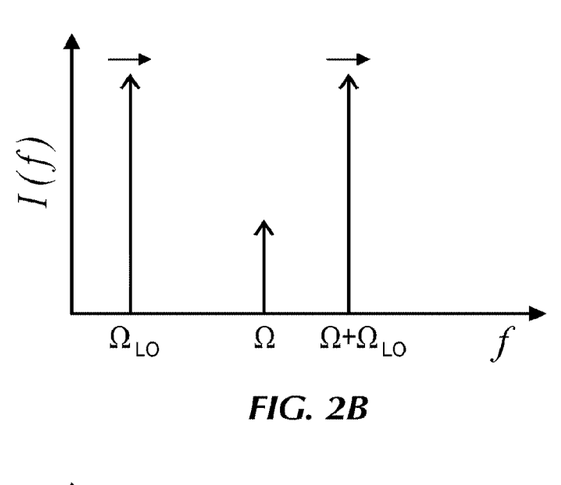
FIG. 2B shows the resulting RF beatnote spectrum after square law detection by the photodetector ($x^2$)
Figure 2D:
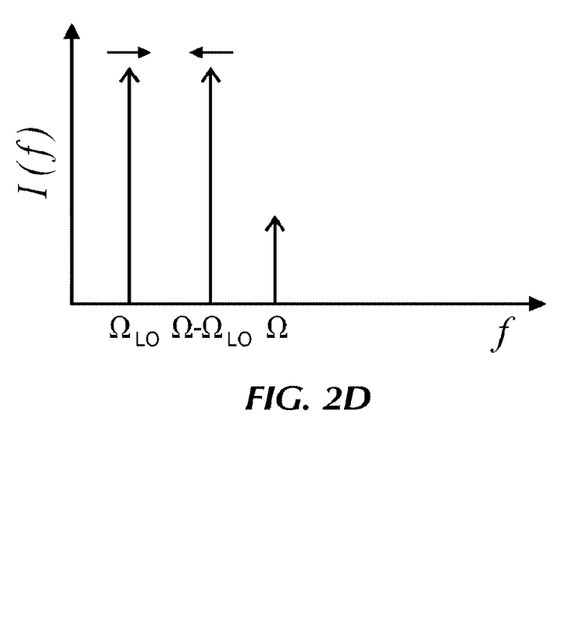
FIG. 2D shows the resulting RF beatnote spectrum after square law detection by the photodetector.

FIG. 2A shows a single-sideband CLaDS optical spectrum with an LO frequency lower than the two wave components in the sample channel. FIG. 2B shows the resulting RF beatnote spectrum after square law detection by the photodetector ($x^2$). A similar RF spectrum would be observed if the LO frequency is higher than the two wave components in the sample channel, and such a configuration could be used alternatively. FIG. 2C shows a single-sideband CLaDS optical spectrum with an LO frequency between the two wave components. FIG. 2D shows the resulting RF beatnote spectrum after square law detection by the photodetector. The sum frequencies generated by the frequency mixing are filtered out by the bandwidth of the photodetector which typically operates in the RF range. The frequency difference between the LO and the closest frequency component in the signal channel is marked as $\Omega_{LO}$. The small horizontal arrows indicate frequency changes due to phase noise in sample channel.

As seen in FIGS. 2A-2D, depending on the relationship between the values of $\Omega_{LO}$ and $\Omega$, the phase noise in the LO-beatnotes (i.e. beatnotes at $\Omega_{LO}\pm\Omega$ and $\Omega_{LO}$) is either correlated (for $\Omega_{LO}>\Omega$) or anti-correlated (for $\Omega_{LO}<\Omega$). To extract spectroscopic data in either configuration, the procedure outline below is executed, either with analog RF electronics (FIG. 3A) or with digital processing (FIG. 3B). To maximize the sensitivity boost, the amplitude of the frequency shifted light wave in the local oscillator arm may be set near the saturation level of the photo detector. In comparison to the sample arm, the amplitude of the frequency shifted light wave in the local oscillator arm will typically be at least 100× the amplitude of the wave in the sample arm measured at the photo detector.

FIG. 3A is a block diagram showing the processing steps 60 using an analog approach. FIG. 3B is a block diagram showing the processing steps 80 using a digital approach. Blocks shown in dashed lines represent features operating in the digital domain. In the analog approach 60, the RF signal from the photodetector (PD) 62 is notch filtered as shown by block 64 to remove the original CLaDS beatnote at $\Omega$, then frequency doubled using a frequency multiplier 66 (e.g. Schottky diode doubler), then the desired frequency is demodulated as shown by block 68 to generate CLaDS signal 70. In the digital approach 80, the RF signal from the PD 82 is mixed down to lower frequency by an electronic LO 84 at $\Omega$ DC, after which the signal is digitized using an analog-to-digital converter (ADC) 86. The digital data is then notch filtered to remove the original CLaDS beatnote as shown by block 88. The output of the filter is then frequency doubled as shown by block 90 (achieved by taking the square of the signal), and subsequently frequency demodulated as shown by block 92 to generate CLaDS signal 94.

In either the analog or digital domain, the heterodyne beatnote generated by the photodetector is first notch filtered to remove the original beatnote at $\Omega$. Then the signal is frequency doubled (equivalent operation of square law detection) to yield the sum and difference frequencies. In the case #1 (LO smaller/larger than frequencies of the two waves in the sample channel), the difference frequency that appears at $\Omega$ is filtered and frequency demodulated to yield the CLaDS spectra. In the case #2 (LO between the frequencies of the two waves in the sample channel), the sum frequency that appears at $2\Omega$ is filtered and frequency demodulated to yield the CLaDS spectra.

It is important to note that while a procedure has been outlined for a single-sideband (SSB) CLaDS configuration with only two frequencies, this methodology holds for a dual-sideband (DSB) CLaDS configuration with three frequencies (carrier and two sidebands), and for multi-heterodyne systems that contain multiple of the waves in the sample channel (e.g. derived from the frequency comb sources). Below, the demonstration of a DSB CLaDS system operating with a local oscillator is presented.

The approach disclosed herein is a process that enhances the performance of existing techniques by enabling significant signal enhancement with the use of a strong local oscillator. A generic process configuration along with details about the required processing has already been described above, including details about the operating principle and required processing.

Figure 4:
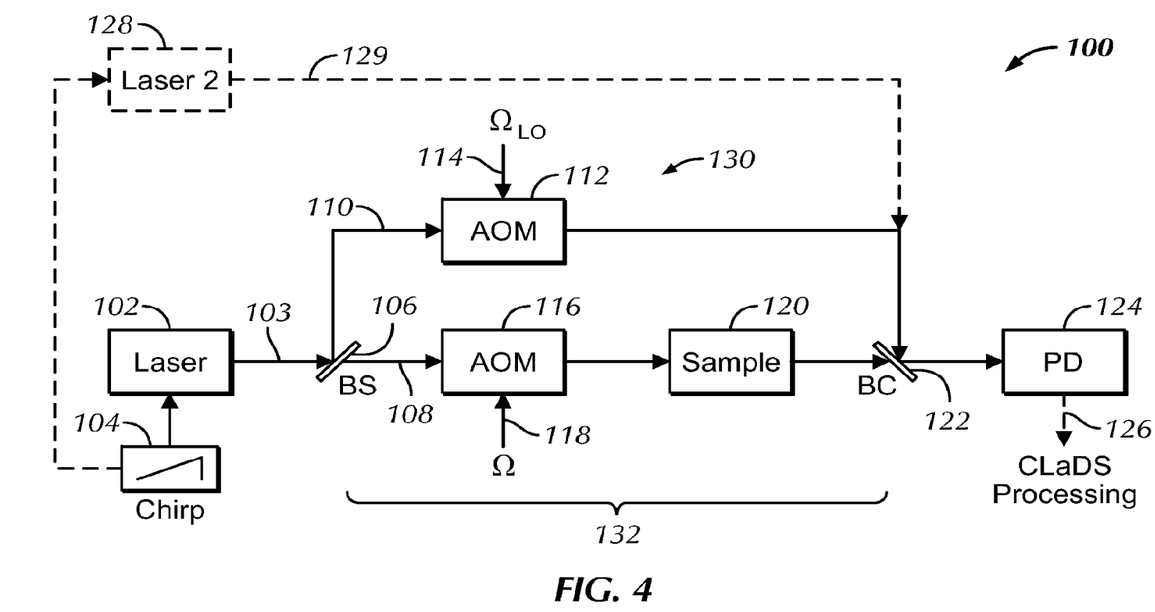
FIG. 4 is a block diagram of a LO-enhanced CLaDS system implemented in free-space.

The implementation of the optical setup with existing technology in different spectral regions is detailed here. In free-space, acousto-optic modulators (AOM) operating as frequency shifters can be used to generate both the LO frequency shift as well as the multi-frequency probe beam. FIG. 4 is a block diagram of a LO-enhanced CLaDS system 100 implemented in free-space. The system 100 includes a chirped laser light source as generally shown by laser 102 having a carrier frequency and an associated ramp function generator 104 configured to scan the laser light source 102 over a range of frequencies. The output from the chirped laser light source 103 is split using a beam splitter (BS) 106 into two arms, a local oscillator channel shown generally by reference number 130 and a sample channel shown generally by reference number 132. It should be understood that an alternative arrangement may be used in which the beam splitter 106 and the AOM 112 are removed and a second laser source 128 is coupled to the ramp function generator 104 to generate the frequency-shifted chirped laser light source for the local oscillator channel 50.

The sample channel 132 follows the original CLaDS system configuration where an AOM 116 is used to generate a multi-frequency beam with known frequency spacing, $\Omega$ (controllable by input 118). Intensity modulator/frequency shifter 116 generates addition sidebands (e.g., one or two) at $\Omega$ around the laser 102 carrier frequency. These co-propagating frequencies interact with the sample under test in the sample cell 120 where the sample's dispersion profile is encoded into the time-varying frequency spacing of the multi-frequency signal. In the LO channel 130, the original laser frequency is shifted via AOM 112 by a known amount, $\Omega_{LO}$ (controllable by input 114). The LO channel 130 and the sample channel 132 are then recombined using a beam combiner (BC) 122 and heterodyne mixed on the photodetector (PD) 124. The output 126 of the PD 124 is then processed as discussed in more detail below.

Figure 5A:
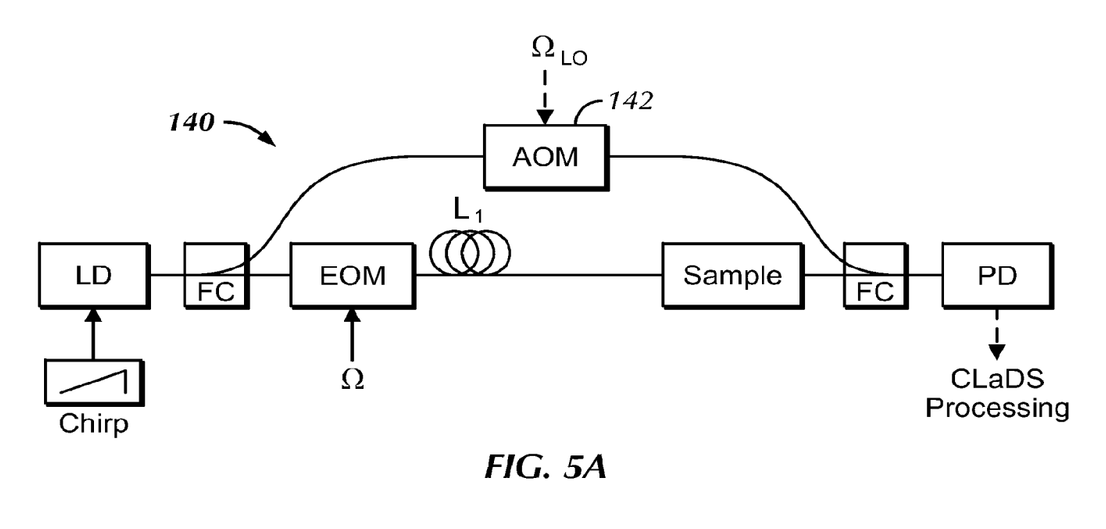
FIG. 5A is an examples implementation of the LO-enhanced CLaDS technique in a fiber-coupled system architecture with an AOM used as a frequency shifter.
Figure 5B:
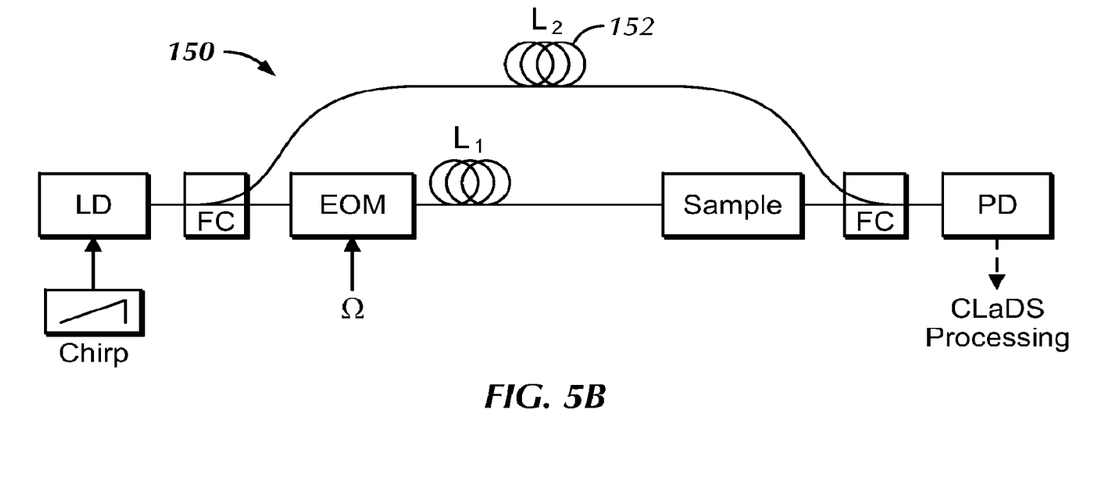
FIG. 5B is an examples implementation of the LO-enhanced CLaDS technique in a fiber-coupled system architecture with a fiber delay used to generate an effective frequency shift.

In fiber-coupled systems electro-optic modulators (EOM) can be used to generate the multi-frequency probe beam, while an AOM generates the LO frequency shift. Alternatively, a simple delay line in fiber can also be used to create a frequency shift based on the difference in propagation delay. FIG. 5A is an examples implementation of the LO-enhanced CLaDS technique in a fiber-coupled system architecture 140 with an AOM 142 used as a frequency shifter. FIG. 5B is an examples implementation of the LO-enhanced CLaDS technique in a fiber-coupled system architecture 150 with a fiber delay 152 used to generate an effective frequency shift. In both configurations, fiber-couplers (FCs) are used to split and recombine the signals.

In addition to the CLaDS technique detailed above, the approach disclosed herein could be incorporated into other phase-sensitive spectroscopic techniques. For example, Chirp-Modulated (CM) CLaDS, a technique where additional modulation of the laser chirp allows for harmonic detection resulting in reduced detection bandwidths and therefore reduced noise, can also be modified to include this LO-enhancement.

Systems based around coherent multi-mode sources, such as frequency combs or other multi-heterodyne techniques, could also be modified to include this LO-enhancement. In a dual-comb sensing architecture where both combs propagate through the sample, a third LO comb, can be introduced to boost the amplitude of the heterodyned signals.

Figure 1B:
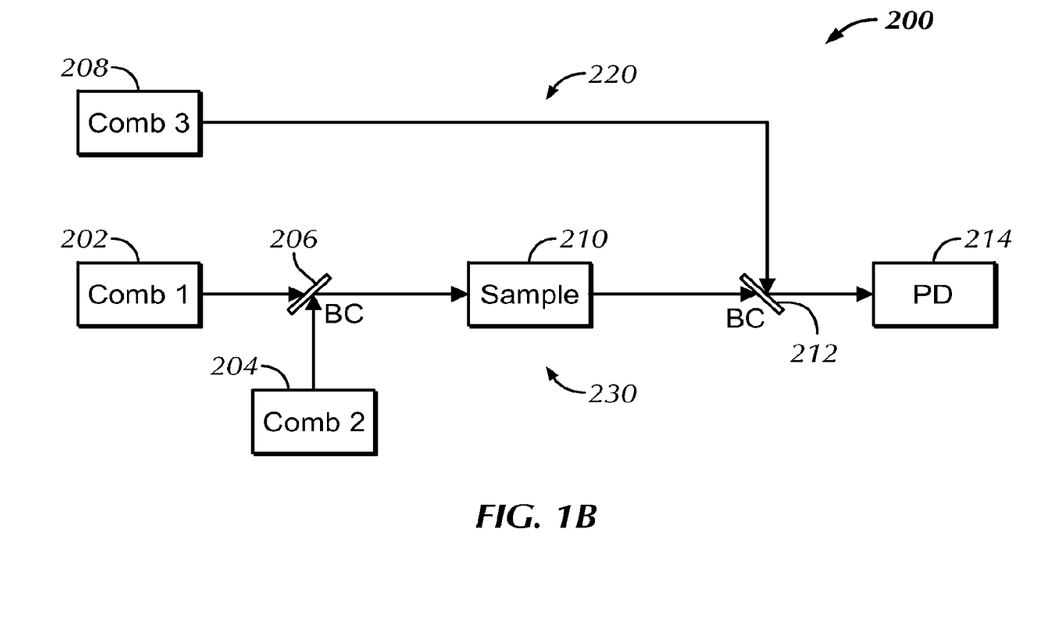
FIG. 1B is a block diagram of a sensitivity boosted frequency comb laser dispersion spectroscopy system.
Figure 2E:
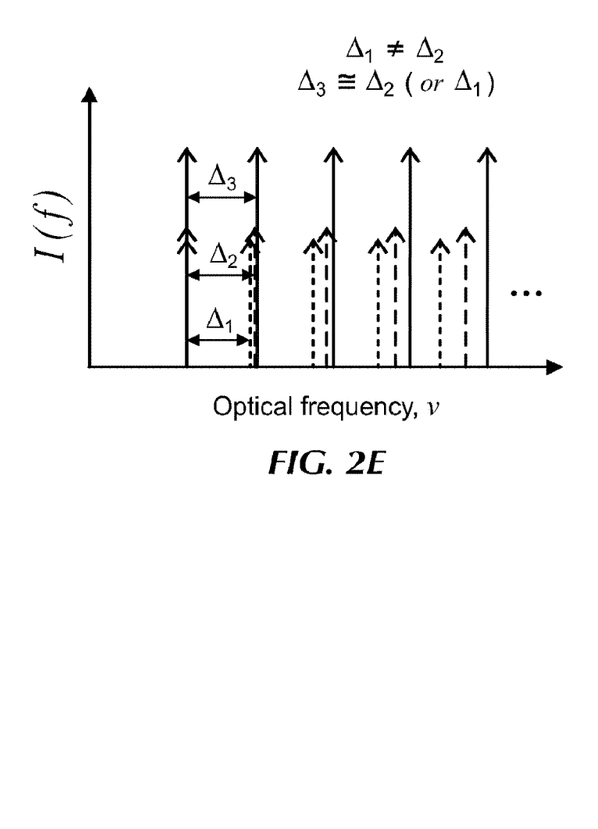
FIG. 2E shows a frequency comb optical spectrum.
Figure 2F:
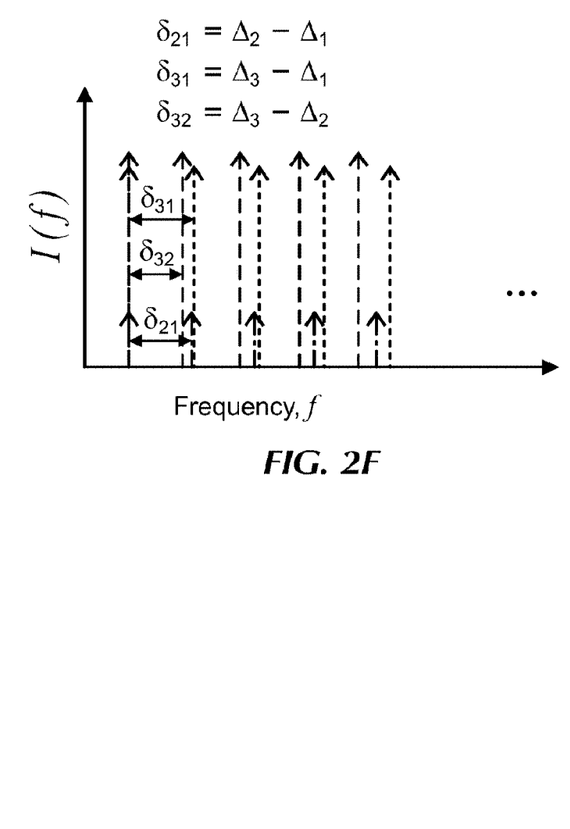
FIG. 2F shows the resulting RF beatnote spectrum after square law detection by the photodetector.

FIG. 1B is a block diagram of a sensitivity boosted frequency comb laser dispersion spectroscopy system 200. Similar to the FM and CLaDS system disclosed above system has two arms, a local oscillator arm shown generally by reference number 220 and a sample arm shown generally by reference number 230. The system 200 includes first and second frequency comb laser sources 202, 204 that are combined via beam combiner 206. The combined sample arm beam is directed through the sample cell 210. The light beams from the local oscillator arm 220 and the sample arm 230 are combined via beam combiner 212 to create a mixed beam. The mixed beam is then directed towards photodetector 214 for detection and further processing. It should be understood that balanced detection may also be used as discussed with respect to FIG. 1A above. FIG. 2E shows an example of a frequency comb optical spectrum. FIG. 2F shows the resulting RF beatnote spectrum after square law detection by the photodetector.

Implementation of this method involves careful selection of the combs free-spectral ranges (FSRs) such that the resultant RF beatnotes between the two signal combs occur in a different frequency range than the beatnotes between the LO comb and each signal comb. For example, the dual-comb RF signals are typically in the kHz range, while the LO frequency offset can be chosen such that its signal occurs in the 100 kHz range. Other works aimed at mitigating the low return powers of open-path systems utilize empirically derived phase compensation techniques and correction factors that are not necessary in the approach disclosed herein.

If the dominate noise source in the system is laser intensity noise, introduction of a strong LO from the same source will introduce additional noise into the spectroscopic measurement. In this case, additional intensity noise mitigation schemes may remove this limitation.

The disclosed system and process have been tested in a fiber-coupled system as illustrated in FIGS. 2C and 2D. A distributed feedback diode laser operating around 1650 nm was used to target the R4 transition in $2v_3$ overtone band of methane. A ~4 m difference in fiber length between the LO and signal channels generated a frequency shift of $\Omega_{LO}$~12 MHz. The signal channel operated using dual-sideband (DSB) operation, generating by driving an EOM with an RF signal at $\Omega$=1 GHz.

Figure 6A:
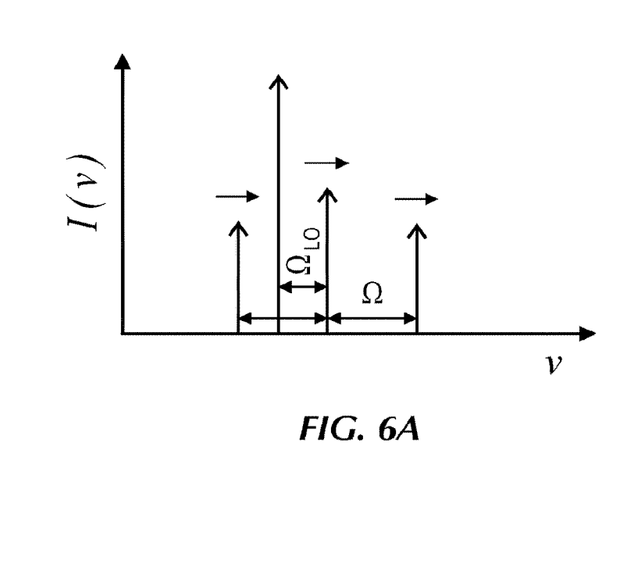
FIG. 6A shows the optical spectrum using DSB CLaDS and an LO frequency shift less than the frequency offset ($Q_{LO}<\Omega$)
Figure 6B:
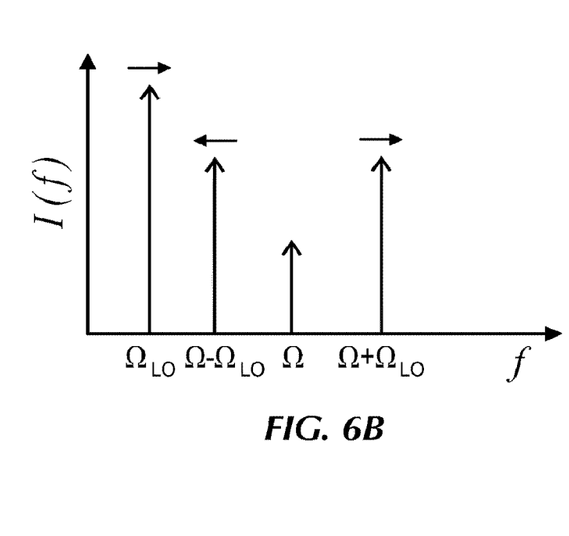
FIG. 6B shows the resulting difference frequency spectrum after mixing on the photodetector.

FIG. 6A shows the optical spectrum using DSB CLaDS and an LO frequency shift less than the frequency offset ($\Omega_{LO}<\Omega$). FIG. 6B shows the resulting difference frequency spectrum after mixing on the photodetector (while sum frequencies are filtered out by the photodetector). To mitigate the external phase noise in the system, the sum frequency of the LO and sideband beatnotes ($\Omega-\Omega_{LO}$ and $\Omega+\Omega_{LO}$) was used for spectral analysis since those beatnotes are anti-correlated. Operation in the DSB configuration is also possible with a LO frequency shift greater than the original offset (i.e. $\Omega_{LO}>\Omega$). Processing of this RF beatnote spectrum was captured using the down conversion and digitization approached outlined in FIGS. 3A and 3B.

Figure 7A:
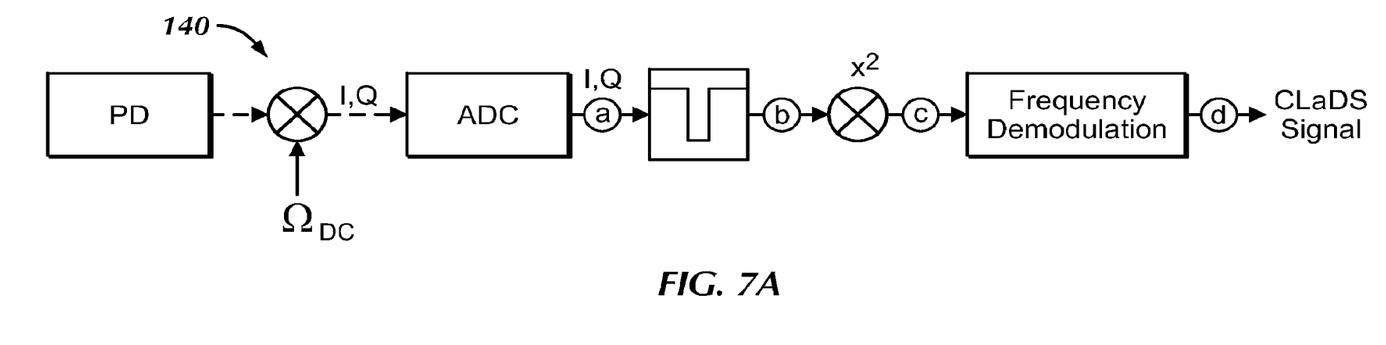
FIG. 7A is a block diagram showing the processing system using a digital approach.
Figure 7B:
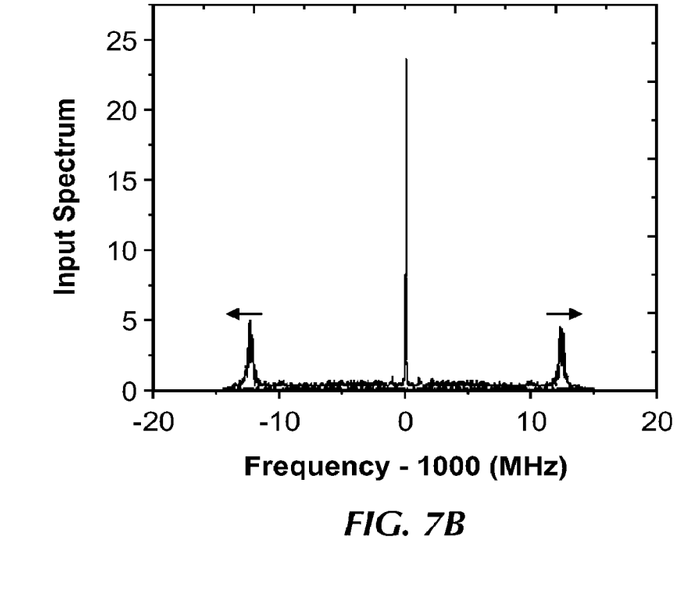
FIG. 7B is a graph of the input spectrum taken at location "a"
Figure 7C:
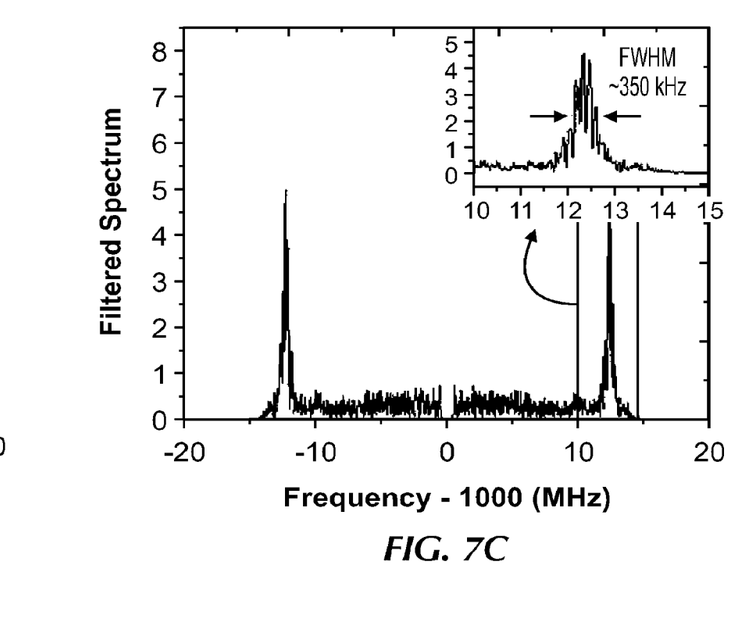
FIG. 7C is a graph of the filtered spectrum taken at location "b"
Figure 7D:
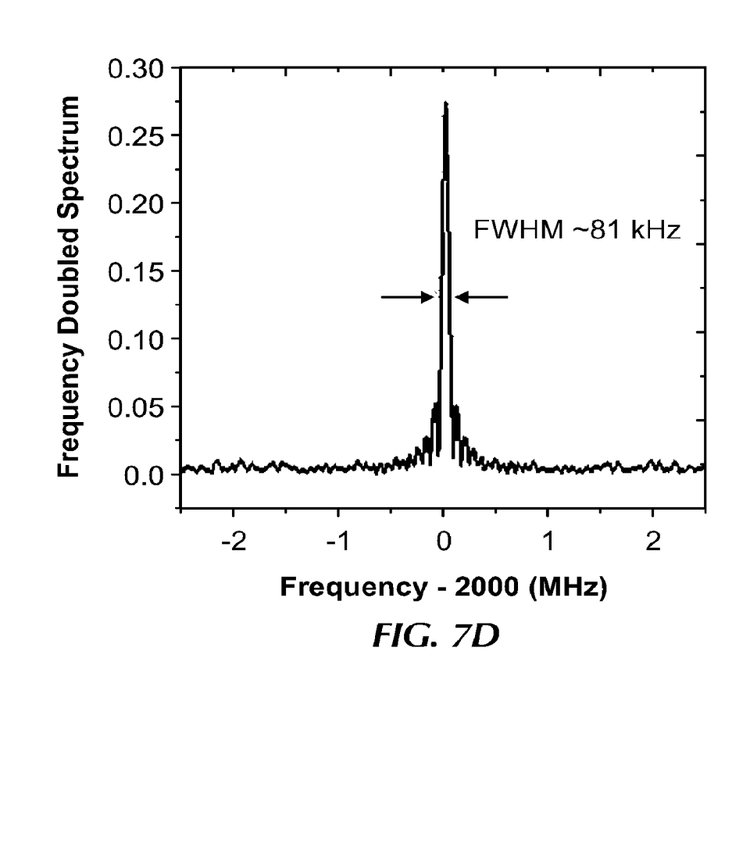
FIG. 7D is a graph of the frequency doubled spectrum taken at location "c"
Figure 7E:
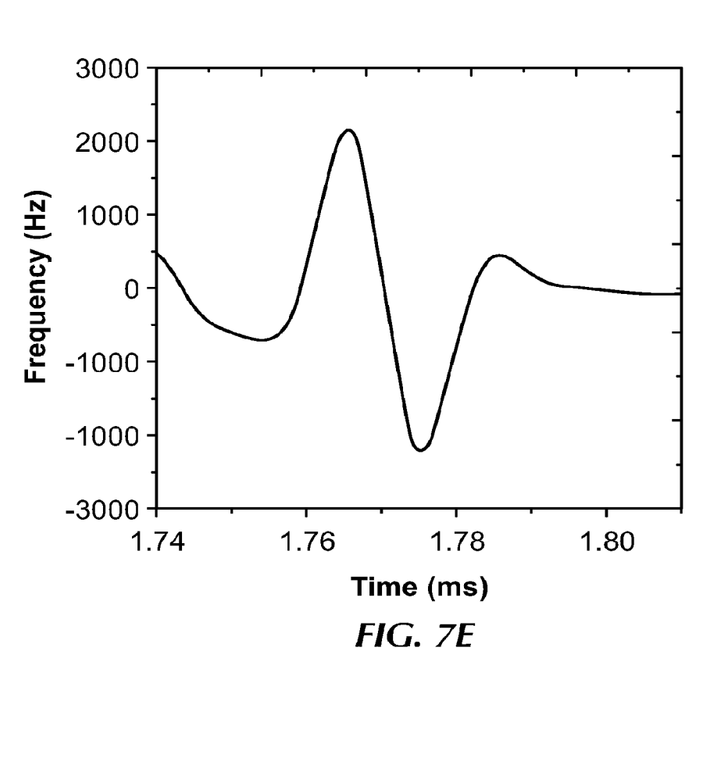
FIG. 7E is a graph of the CLaDS signal spectrum taken at location "d".

FIG. 7A is a block diagram showing the processing system using a digital approach. A benchtop spectrum analyzer (Tektronix RSA5103A) was used to perform the down conversion and subsequent digitization. FIG. 7B is a graph of the input spectrum taken at location "a." FIG. 7C is a graph of the notch-filtered spectrum taken at location "b." FIG. 7D is a graph of the frequency doubled spectrum taken at location "c." FIG. 7E is a graph of the CLaDS signal spectrum taken at location "d" after filtering and frequency demodulation. After digitization, the down-converted signal was high pass filtered to remove beatnote at DC (original at 1 GHz before down-conversion) as shown in FIG. 7C. To extract the sum frequency of the remaining beatnotes, the time domain signal is frequency doubled, yielding a spectrum as shown in FIG. 7D. Through this latter process the anti-correlated phase noise is removed by the sum frequency generation; an effect that can be seen in the beatnote widths of 350 kHz in FIG. 2b and only 81 kHz in FIG. 7D. After the digital mixing, the resulting signal is frequency demodulated to reveal the CLaDS spectra. Through this analysis, the concept that CLaDS spectra can be achieved through LO-enhanced detection has been experimentally verified.

The system and process disclosed herein can be incorporated into existing CLaDS system through the addition of the local oscillator optical channel and modification to the processing system. With this modification, there is potential to enhance the detection limits of sensing systems (especially those operating in remote or stand-off configuration), without the need for ultra-stable optical alignments required by some other phase sensitive technologies. In addition, this improvement may allow remote sensing systems which were previously limited to operation using retro-reflective hard targets the ability to operate with less expensive retroreflecting tapes, or any other diffusely reflecting targets.

The disclosed approach has utility, inter alia, for laser sensor systems for remote, open-path sensing applications. The ability to operate the disclosed technique with both near-IR and mid-IR technologies make the disclosed approach particularly interesting for high sensitivity, open path measurements of atmospheric constituents such as $CH_4$, NO, $H_2O$, $NH_3$, etc.

Further disclosure is contained in U.S. provisional application 62/345,953 filed Jun. 6, 2016, which is incorporated herein in its entirety. It should be understood that many variations are possible based on the disclosure herein. Although features and elements are described above in particular combinations, each feature or element can be used alone without the other features and elements or in various combinations with or without other features and elements. The digital processing techniques disclosed herein may be partially implemented in a computer program, software, or firmware incorporated in a computer-readable (non-transitory) storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine.

What is claimed is:

1. A sensitivity boosted laser dispersion spectroscopy system for sensing a sample, the system comprising:
   a local oscillator arm and a sample arm containing the sample;
   a laser source configured to generate a first light beam directed along the sample arm and a second light beam, the second light beam being frequency shifted and directed along the local oscillator arm;
   an intensity modulator/phase modulator/frequency shifter disposed in the sample arm configured to generate a multi-frequency beam having known frequency spacing which is then passed through the sample to generate a sample arm output;
   a beam combiner configured to combine the sample arm output and the second light beam from the local oscillator arm and generate a combined beam; and
   a photodetector configured to detect the combined beam for sensing the sample.

2. The system of claim 1 further comprising a ramp function generator coupled to the laser source to generate chirped first and second light beams for chirped laser dispersion spectroscopy (CLaDS).

3. The system of claim 1 further comprising a beam splitter configured to generate the first and second light beams from a single laser.

4. The system of claim 3 further comprising a frequency shifter disposed in the local oscillator arm configured to generate a frequency shifted light beam from the single laser.

5. The system of claim 1 further comprising a second laser configured to generate a frequency shifted light beam for the local oscillator arm.

6. The system of claim 1 wherein the frequency shifted light beam on the local oscillator arm has an amplitude that is set based on a saturation level of the photo detector.

7. The system of claim 1 wherein the frequency shifted light beam on the local oscillator arm has a first amplitude and sample arm output has a second amplitude wherein the first amplitude is at least 100× the second amplitude.

8. The system of claim 1 further comprising a notch filter coupled to the photo detector, the notch filter being configured to generate a filtered output, a frequency multiplier coupled to the notch filter, the frequency multiplier being configured to generate a multiplied filtered output and a demodulator coupled to the frequency multiplier, the demodulator being configured to generate a demodulated output.

9. The system of claim 1 further comprising an analog to digital (A/D) converter coupled to the photodetector, the A/D converted being configured to generate a digital output, a notch filter coupled to the digital output, the notch filter being configured to generate a filtered digital output, a frequency multiplier coupled to the notch filter, the frequency multiplier being configured to generate a multiplied filtered digital output and a demodulator coupled to the frequency multiplier, the demodulator being configured to generate a demodulated digital output.

10. The system of claim 1 further comprising a second photo detector configured for balanced detection of the combined beam.

11. The system of claim 1, wherein at least one of the intensity modulator/phase modulator/frequency shifter in the sample arm and frequency shifter in the local oscillator arm are acousto-optic modulators.

12. The system of claim 1, wherein the intensity modulator/phase modulator/frequency shifter in the sample arm is an electro-optic modulator and the frequency shifter in the local oscillator arm is an acousto-optic modulator.

13. The system of claim 1, wherein at least one of the intensity modulator/phase modulator/frequency shifter in the sample arm and frequency shifter in the local oscillator arm are comprised of delay lines.

14. A sensitivity boosted frequency comb laser dispersion spectroscopy system for sensing a sample, the system comprising:

a local oscillator arm and a sample arm containing the sample;

laser sources configured to generate a first frequency comb light beam having its frequency components separated by the first interval and a second frequency comb light beam having its frequency components separated by the second interval that is different than the first interval, the first and the second frequency comb light beams are co-aligned on a beam combiner and directed along the sample arm to create a sample arm output and a third frequency comb light beam having its frequency components separated by the third interval that is different than the first and the second interval, the third frequency comb light beam being directed along the local oscillator arm;

a beam combiner configured to combine the first and the second frequency comb light beams and generate a combined sample beam; and a second beam combiner configured to combine the sample arm output and the third light beam from the local oscillator arm and generate a combined beam; and a photodetector configured to detect the combined beam for sensing the sample.

15. The system of claim 14 wherein the second frequency comb light beam on the local oscillator arm has an amplitude that is set based on a saturation level of the photo detector.

16. The system of claim 14 wherein the second frequency comb light beam on the local oscillator arm has a first amplitude and sample arm output has a second amplitude wherein the first amplitude is at least 100× the second amplitude.

17. The system of claim 14 further comprising a notch comb filter coupled to the photo detector, the notch comb filter being configured to generate a filtered output, a frequency multiplier coupled to the notch comb filter, the frequency multiplier being configured to generate a multiplied filtered output and a demodulator coupled to the frequency multiplier, the demodulator being configured to generate a demodulated output.

18. The system of claim 14 further comprising an analog to digital (A/D) converter coupled to the photodetector, the A/D converted being configured to generate a digital output, a notch comb filter coupled to the digital output, the notch comb filter being configured to generate a filtered digital output, a frequency multiplier coupled to the notch comb filter, the frequency multiplier being configured to generate a multiplied filtered digital output and a demodulator coupled to the frequency multiplier, the demodulator being configured to generate a demodulated digital output.

19. The system of claim 14 further comprising a second photo detector configured for balanced detection of the combined beam.

20. A method for sensing a sample using a sensitivity boosted laser dispersion spectroscopy system, the method comprising:

providing a local oscillator arm and a sample arm containing the sample;

generating a first light beam directed along the sample arm and a second light beam, the second light beam being frequency shifted and directed along the local oscillator arm;

generating a multi-frequency beam in the sample arm, the multi-frequency beam having known frequency spacing which is then passed through the sample to generate a sample arm output;

combining the sample arm output and the second light beam from the local oscillator arm and generate a combined beam; and detecting the combined beam for sensing the sample.

21. The method of claim 20 further comprising generating chirped first and second light beams for chirped laser dispersion spectroscopy (CLaDS).

22. The method of claim 20 further comprising generating the first and second light beams from a single laser.

23. The method of claim 22 further comprising generating a frequency shifted light beam from the single laser.

24. The method of claim 20 wherein the frequency shifted light beam on the local oscillator arm has an amplitude that is set based on a saturation level of the photo detector.

25. The method of claim 20 wherein the frequency shifted light beam on the local oscillator arm has a first amplitude and sample arm output has a second amplitude wherein the first amplitude is at least 100× the second amplitude.

26. The method of claim 20 further comprising notch filtering the detected combined beam to generate a filtered output, frequency multiplying the filtered output generate a multiplied filtered output and demodulating the multiplied filtered output to generate a demodulated output.

27. The method of claim 20 further comprising analog to digital (A/D) converting the detected combined beam to generate a digital output, notch filtering the digital output to generate a filtered digital output, frequency multiplying the filtered digital output to generate a multiplied filtered digital output and demodulating the multiplied filtered digital output to generate a demodulated digital output.

28. The method of claim 20 further comprising performing balanced detection of the combined beam.

29. A method for sensing a sample using a sensitivity boosted frequency comb laser dispersion spectroscopy system, the method comprising:

providing a local oscillator arm and a sample arm containing the sample;

generating a first frequency comb light beam having its frequency components separated by the first interval and a second frequency comb light beam having its frequency components separated by the second interval that is different than the first interval, the first and the second frequency comb light beams are co-aligned on a beam combiner and directed along the sample arm to create a sample arm output and a third frequency comb light beam having its frequency components separated by the third interval that is different than the first and the second interval, the third frequency comb light beam being directed along the local oscillator arm;

combining the first and the second frequency comb light beams and generate a combined sample beam; and combining the sample arm output and the third light beam from the local oscillator arm and generating a combined beam; and detecting the combined beam for sensing the sample.

30. The method of claim 29 wherein the second frequency comb light beam on the local oscillator arm has an amplitude that is set based on a saturation level of the photo detector.

31. The method of claim 29 wherein the second frequency comb light beam on the local oscillator arm has a first amplitude and sample arm output has a second amplitude wherein the first amplitude is at least 100× the second amplitude.

32. The method of claim 29 further comprising notch comb filtering the detected combined beam to generate a filtered output, frequency multiplying the filtered output generate a multiplied filtered output and demodulating the multiplied filtered output to generate a demodulated output.

33. The method of claim 29 further comprising analog to digital (A/D) converting the detected combined beam to generate a digital output, notch comb filtering the digital output to generate a filtered digital output, frequency multiplying the filtered digital output to generate a multiplied filtered digital output and demodulating the multiplied filtered digital output to generate a demodulated digital output.

34. The method of claim 29 further comprising performing balanced detection of the combined beam.

\* \* \* \* \*